US010489884B2

(12) United States Patent
Hayward et al.

(10) Patent No.: US 10,489,884 B2
(45) Date of Patent: Nov. 26, 2019

(54) FAST AND EDGE-PRESERVING UPSAMPLING OF IMAGES

(71) Applicant: APPLE INC., Cupertino, CA (US)

(72) Inventors: David Hayward, Los Altos, CA (US); Garrett M. Johnson, San Francisco, CA (US)

(73) Assignee: APPLE INC., Cupertino, CA (US)

(*) Notice: Subject to any disclaimer, the term of this patent is extended or adjusted under 35 U.S.C. 154(b) by 46 days.

(21) Appl. No.: 15/633,632

(22) Filed: Jun. 26, 2017

(65) Prior Publication Data

US 2018/0089800 A1 Mar. 29, 2018

Related U.S. Application Data

(60) Provisional application No. 62/399,318, filed on Sep. 23, 2016.

(51) Int. Cl.
*G06T 3/40* (2006.01)
*G06T 11/60* (2006.01)
*G06T 5/00* (2006.01)
*G06T 5/50* (2006.01)

(52) U.S. Cl.
CPC .......... *G06T 3/403* (2013.01); *G06T 3/4007* (2013.01); *G06T 5/002* (2013.01); *G06T 5/50* (2013.01); *G06T 11/60* (2013.01); *G06T 2207/20192* (2013.01); *G06T 2210/36* (2013.01)

(58) Field of Classification Search
CPC ....... G06T 3/403; G06T 3/4007; G06T 5/002; G06T 5/50; G06T 11/60; G06T 5/40; G06T 2207/10004; G06T 2207/20192; G06T 2207/20021
See application file for complete search history.

(56) References Cited

U.S. PATENT DOCUMENTS

| | | | |
|---|---|---|---|
| 8,265,409 B2 | 11/2012 | Katagiri et al. | |
| 8,369,653 B1 | 2/2013 | Cohen | |
| 8,571,309 B2 | 10/2013 | Krishnan et al. | |
| 8,625,921 B1 | 1/2014 | Kokemohr | |
| 8,995,783 B2 | 3/2015 | Verrall et al. | |
| 9,076,236 B2 | 7/2015 | Krishnan et al. | |
| 9,189,831 B2 | 11/2015 | Wu et al. | |
| 9,741,096 B2 * | 8/2017 | Krishnan | G06T 3/4092 |
| 2016/0048952 A1 | 2/2016 | Tezaur et al. | |

* cited by examiner

*Primary Examiner* — Duy M Dang
(74) *Attorney, Agent, or Firm* — Invoke

(57) ABSTRACT

Disclosed herein are methods and systems for fast and edge preserving upsampling of a small data image based on one or more guide images. During the upsampling process, selected data from the one or more guide images are combined with data from the data image to generate an upsampled pixel in an upsampled image. The upsampling can occur directly from the data image or sequentially via one or more intermediate upsampled images.

33 Claims, 8 Drawing Sheets

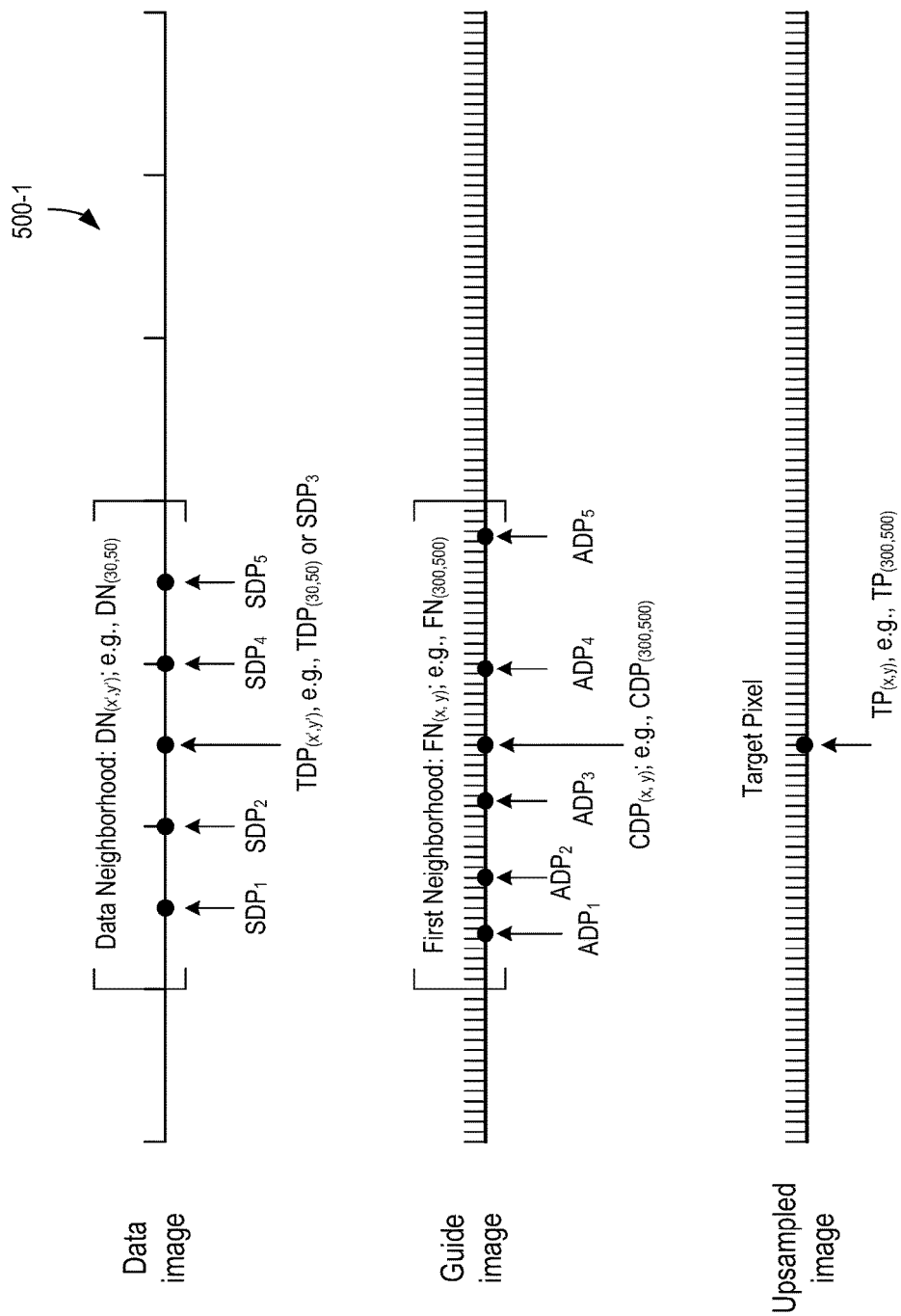

FAST AND EDGE-PRESERVING UPSAMPLING OF IMAGES

CROSS-REFERENCE TO RELATED APPLICATIONS

This application claims priority to U.S. Provisional Application Ser. No. 62/399,318, filed Sep. 23, 2016, the content of which is incorporated herein by reference in its entirety.

TECHNICAL FIELD

The disclosure generally relates to methods and systems for resizing digital images.

BACKGROUND

When resizing an image, it is important to preserve the sharpness of the original image. When upsampling an image, especially when the upsampling factor is large (e.g., the output upsampled image is much larger than the input image), a large amount of previously non-existing data need to be created.

Traditional upsampling algorithms with no edge preservation result in larger but low quality images that are often blurred or have halo or other defects. When edge preservation is applied, the quality of the output upsampled image can be improved. However, the amount of computation that is needed to create the previously non-existing data can be daunting, especially when the upsampling factor is large.

What is need in the art are methods and systems that will allow fast and high quality upsampling.

SUMMARY

In one aspect, disclosed herein are methods and systems for quickly upsampling a small digital image using a larger image as a guide. The methods and systems maintain the sharp edges of the large image, while smoothly interpolating the image where there are no edges. During upsampling, there are always tradeoffs between smoothness and sharpness. In particular, the methods and systems disclosed herein make it possible to maintain smoothness in areas of an image where smoothness is desired and to maintain sharpness in other areas of an image where sharpness is desired.

In one aspect, disclosed herein is a fast and edge preserving image upsampling method, using a data image and a larger guide image based on selective sampling. In some embodiments, two guide images are used. In some embodiments, the method comprises the steps of identifying, for a target pixel $TP_{\{x,y\}}$ in the result image where x and y are integers representing the location of the target pixel, a plurality of pixels in the data image, where the plurality of pixels is within a predetermined neighborhood within the data image; and determining the value of the target pixel in the result image based on a weighted average of the plurality of pixels from the data image based on a plurality of data points from the first and second guide images, where the data points are collectively selected from within a first neighborhood in the first guide image and a second neighborhood in the second guide image, both neighborhoods being identified based on the predetermined neighborhood in the data image; and where the plurality of data points forms a small subset of the first and second guide images.

In one aspect, also disclose herein is a computer system. The computer system comprises one or more processors and a memory accessible to the one or more processors. In some embodiments, the memory stores instructions executable by the one or more processors to perform upsampling of images based on selective sampling, as disclosed herein.

In one aspect, also disclose herein is a non-transitory computer-readable medium. The non-transitory computer-readable medium contains instructions that, when executed by a computer processor, cause the computer processor to perform upsampling of images based on selective sampling, as disclosed herein. It will be understood that all embodiments disclosed herein when applicable can be used, alone or in combination, in connection with any aspect disclosed herein.

Details of one or more implementations are set forth in the accompanying drawings and the description below. Other features, aspects, and potential advantages will be apparent from the description and drawings, and from the claims.

DESCRIPTION OF DRAWINGS

FIG. 5A illustrates an example schematic for data processing according to the fast edge-preserving upsampling methods.

Like reference symbols in the various drawings indicate like elements.

DETAILED DESCRIPTION

Overview

In one aspect, disclosed herein are methods and systems for quickly upsampling a potentially very small digital image using a large image as a guide. The methods and systems maintain the sharp edges of the large image, while smoothly interpolating the image where there are no edges.

Unless otherwise specified, images disclosed herein refer to only digital images.

Figure 1:
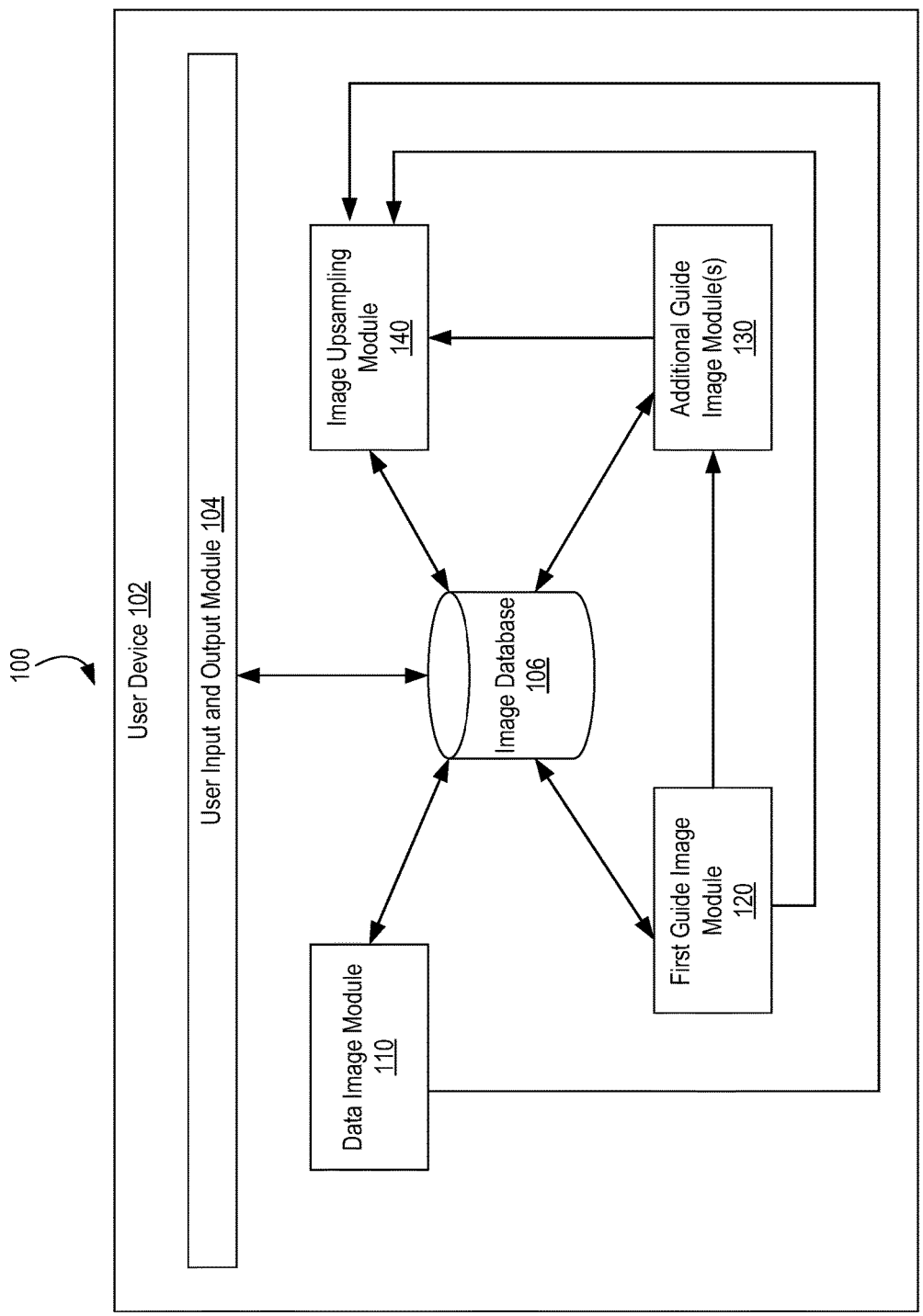
FIG. 1 is a block diagram of an example system for performing fast edge-preserving upsampling of digital images.

FIG. 1 is a block diagram of an example system 100 for performing fast edge preserving upsampling. For example, system 100 can perform the fast edge preserving upsampling of a digital image by using a large image as a guide image. The edge information of the guide image is maintained during upsampling while smoothly interpolation is done where there are no edges. In some embodiments, multiple guide images are used during upsampling. In some embodiments, system 100 utilizes a number of functional modules to achieve the various functionalities, including data image module 110, first guide image processing module 120, second guide image processing module 130 and image upsampling module 140.

Unless otherwise specified, images disclosed herein refer to digital images. Also, unless otherwise specified, the terms "image processing module," "processing module," and "image module" can be used interchangeably.

In some embodiments, system 100 can include user device 102. For example, user device 102 can be a computing device such as a smartphone, a tablet computer, a laptop computer, or a wearable device (e.g., smart watch, smart glasses, etc.).

In some embodiments, user device 102 includes a user input and output module (I/O module) 104. For example, I/O module 104 can receive user input to user device 102 and present output from user device 102 using audio, video, and/or haptic output mechanisms. For example, I/O module 104 can receive touch input from a touch sensitive display of user device 102. In other embodiments, the user input and output module can be coupled to other input devices, such as a keyboard, mouse, touch sensitive pad, etc., and receive user input from these devices.

In some embodiments, I/O module 104 can present audio, visual, and/or haptic output to the user. For example, I/O module 104 can render graphical user interfaces (GUI) for performing spatially localized image editing, as described herein. I/O module 104 can present GUIs that enable or support the functionality of one or more of the image processing modules described herein, including but not limited to data image module 110, first guide image module 120, second guide image 130 and image upsampling module 140. In some embodiments, the user input and output module includes a plurality of menu commands, each corresponding to the functionality of one or more of the image processing modules. In some embodiments, I/O module 104 can allow a user to enter voice commands for performing fast and edge preserved image upsampling, as described herein. Additionally, for example, I/O module 104 can allow a user to enter commands by tapping a touch screen.

In some embodiments, user device 102 can include image database 106. For example, image data base 106 includes images that are taken and saved on user device 102. In some embodiments, a user can store images at various stages of processing in image database 106. The functionality is achieved by connecting different processing modules (e.g., modules 110, 120, 130 and 140) to a centralized image database.

In some embodiments, user device 102 can include data image module 110. For example, a user can select (e.g., via user input and output module 104) an image (e.g., data image 220 in FIG. 2) stored in image database 106 for upsampling. Data images are images that will be upsampled by system 100. The method and system disclosed herein can upsample any data image to a larger output image. The term "upsampling factor" reflects the size difference between the large output image (aka upsampled image) and the small data image. In some embodiments, the output image is 100 times of the size of the data image; i.e., the upsampling factor (uF) is 100. In some embodiments, the upsampling factor is 10 times, 20 times, 1000 times, or some other multiple of the size of the data image.

In some embodiments, a small data image is downsampled from a large input image. For example, the large input image can be downsampled after localized image editing or adjustments have been applied to different areas of the input image. Here, each pixel in data image 220 is downsampled from a predefined region (e.g., a bin or tile of m×n pixels) in the much larger input image and associated with an adjustment algorithm that is applied to the predefined region.

Additional details on spatially localized image editing methods can be found in application Ser. No. 15/275,205 filed on Sep. 23, 2016, entitled "METHODS AND SYSTEMS FOR SPATIALLY LOCALIZED IMAGE EDITING", which is hereby incorporated by reference in its entirety.

In some embodiments, user device 102 can include first guide image processing module 120. For example, first guide image processing module 120 can generate an image as first guide image 230 that is much larger than data image 220. In some embodiments, first guide image processing module 120 obtains large input image 210 from image database 106 and creates first guide image 230 based on large input image 210. For example, first guide image processing module can generate first guide image 230 by converting large input image 210 into a grey scale image.

In some embodiments, input image 210 is optional and first guide image processing module 120 directly obtains first guide image 230. For example, first guide image processing module 120 can obtain first guide image 230 from image database 106. In some embodiments, a user can select first guide image 230 among images saved on image database 106. For example, user I/O module 104 can present a graphical user interface that presents a menu or pull down command list for selecting the first guide image 230 from a plurality of images stored in image database 106. In some embodiments, data image module 110 and first guide image processing module 120 are combined in one functional module.

In some embodiments, user I/O module 104 can receive user input indicating that first guide image 230 from first guide image processing module 120 should be saved or stored in image database 106. In response to receiving the user input, first guide image processing module 120 can store first guide image 230 in image database 106. In some embodiments, first guide image module 120 can send first guide image 230 to second guide image module 130 for further processing. For example, a user can select one or more commands (e.g., "save image data" and "continue to process image") through via I/O module 104 to execute one or both options. In response to receiving the user input selecting a command to continue processing the image, first guide image module 120 can send first guide image 230 to second guide image module 130. Alternatively, in some embodiments, user device 102 selects first guide image 230 automatically once a user selects a data image.

In some embodiments, user device 102 can include second guide image processing module 130. For example, second guide image processing module 130 can generate second guide image 240. In some embodiments, a user can select second guide image 230 among images saved on image database 106. For example, a user can select through a menu or pull down command list presented by I/O module 104.

In some embodiments, second guide image module 130 creates second guide image 240 based on first guide image 230. In some embodiments, second guide image processing module 130 creates second guide image 240 by blurring first guide image 230. In some embodiments, second guide image processing module 130 creates second guide image 240 by resizing first guide image 230. For example, second guide image processing module 130 can generate second guide image 240 based on a resizing algorithm such as nearest-neighbor interpolation, bilinear interpolation, bicubic interpolation, Lanczos resampling, Fourier-based interpolation, edge-directed interpolation algorithms, and etc. In some embodiments, an edge preserving resizing algorithm is used, including but not limited to New Edge-Directed Interpolation (NEDI), Edge-Guided Image Interpolation (EGGI), Iterative Curvature-Based Interpolation (ICBI), and Directional Cubic Convolution Interpolation (DCCI).

In some embodiments, second guide image module 130 is optional. In some embodiments, second guide image module 130 can send second guide image 240 to upsampling module 140 for further processing. For example, a user can select one or more commands (e.g., "save image data" and "upsample image") through via I/O module 104 to execute one or both options. In response to receiving the user input selecting a command to continue processing the image, second guide image module 130 can send first guide image 230, second guide image 240 and data image 220 to image upsampling module 140. Alternatively, user device 102 creates second guide image automatically once a user selects data image 220 and first guide image 230.

In some embodiments, the system disclosed herein further comprises image upsampling module 140. Image upsampling module 140 upsamples data image 220 to a larger upsampled image (e.g., edge preserved upsampled image 250) based on one or more guide images. In some embodiments, first guide image 230 is used. In some embodiments, second guide image 240 is used. In some embodiments, first guide image 230 and second guide image 240 are used. For example, user device 102 can select data image 220, first guide image 230 and second guide image 240 via a selection menu of I/O module 104 as input for image upsampling module 140. Alternatively, user device 102 creates upsampled image 250 automatically once a user selects data image 220 and one or more guide images (e.g., 230 and 240).

Image upsampling module 140 combines data information from data image 220 with that of one or more guide images to calculate image information that will form upsampled image 250.

As disclosed herein, the terms "upsampled image," "final image", "final upsampled image," and "result image" are used changeably.

Figure 2A:
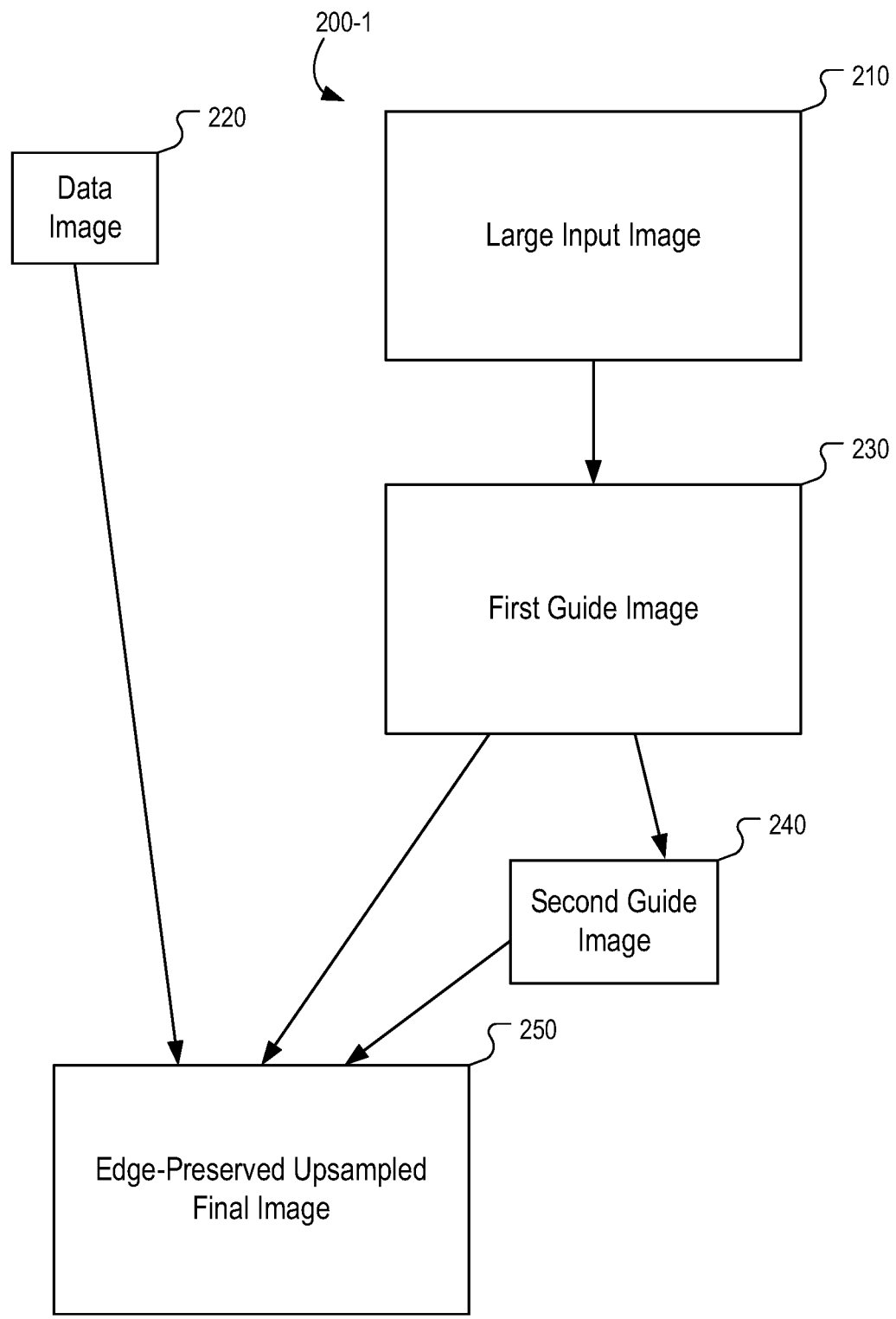
FIG. 2A is an illustration of an example process of the fast edge-preserving upsampling methods.
Figure 2B:
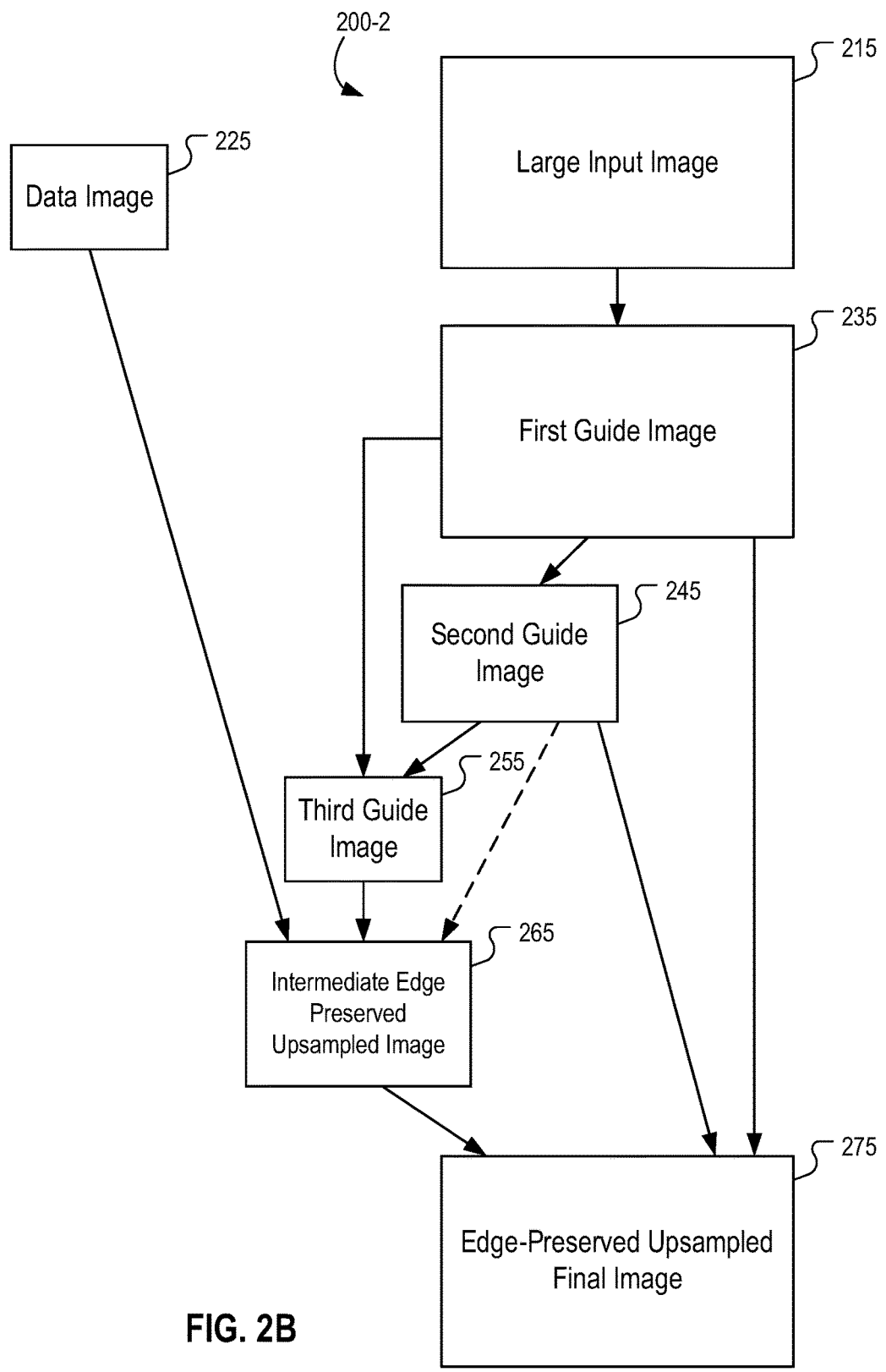
FIG. 2B is an illustration of an example process of the fast edge-preserving upsampling methods
Figure 3:
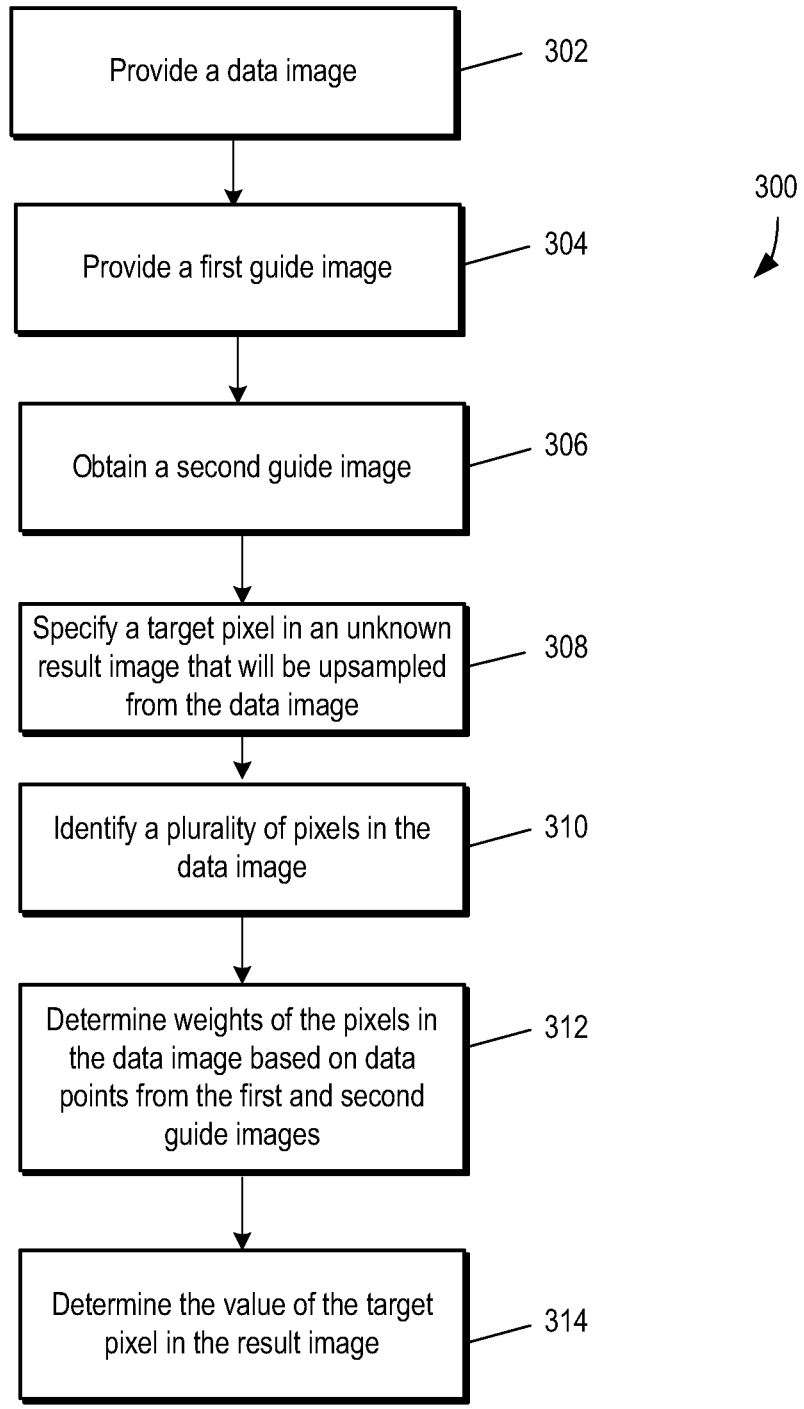
FIG. 3 is flow diagram of an example process of the fast edge-preserving upsampling methods.
Figure 4:
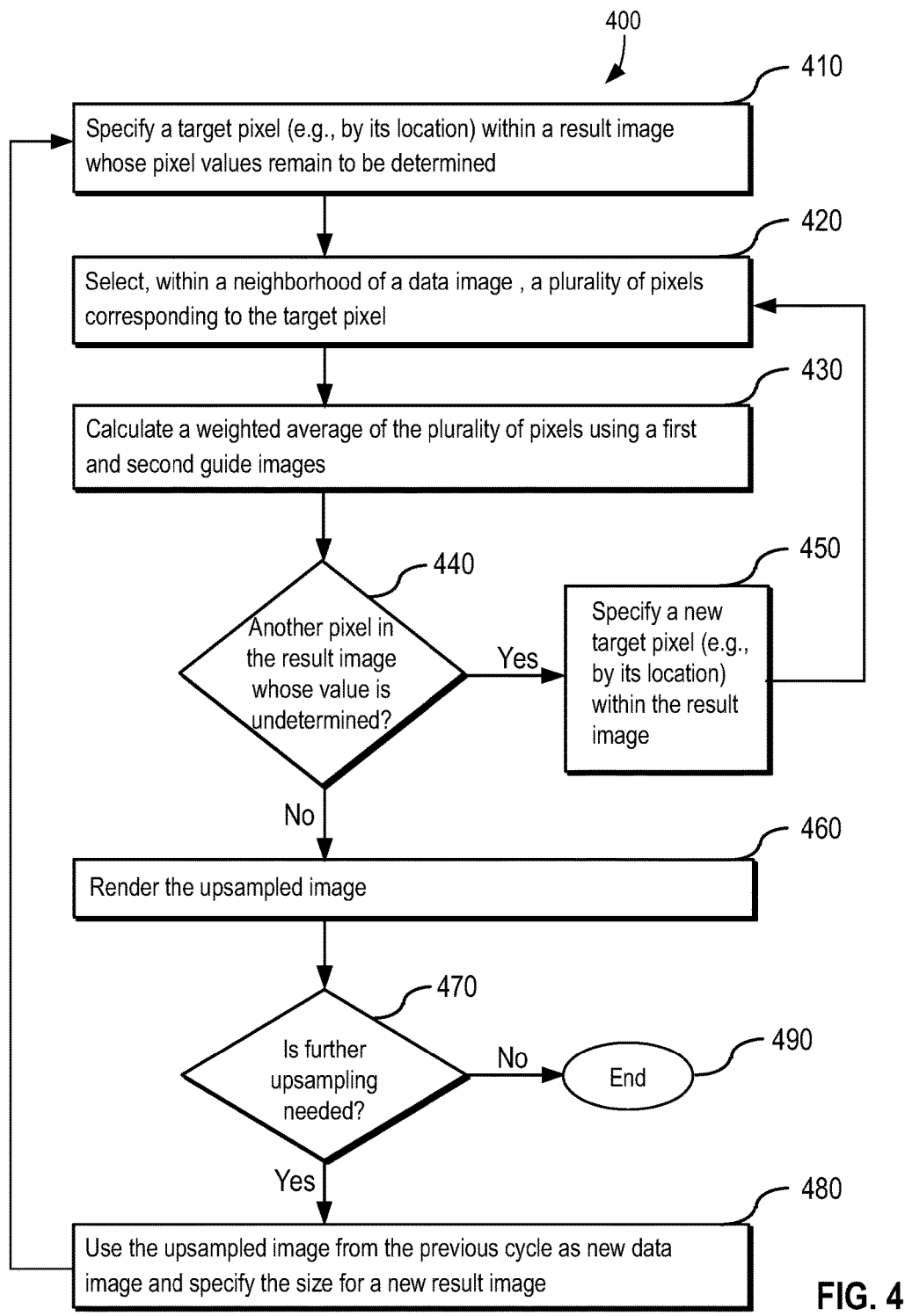
FIG. 4 is flow diagram of an example process of the fast edge-preserving upsampling methods.
Figure 5B:
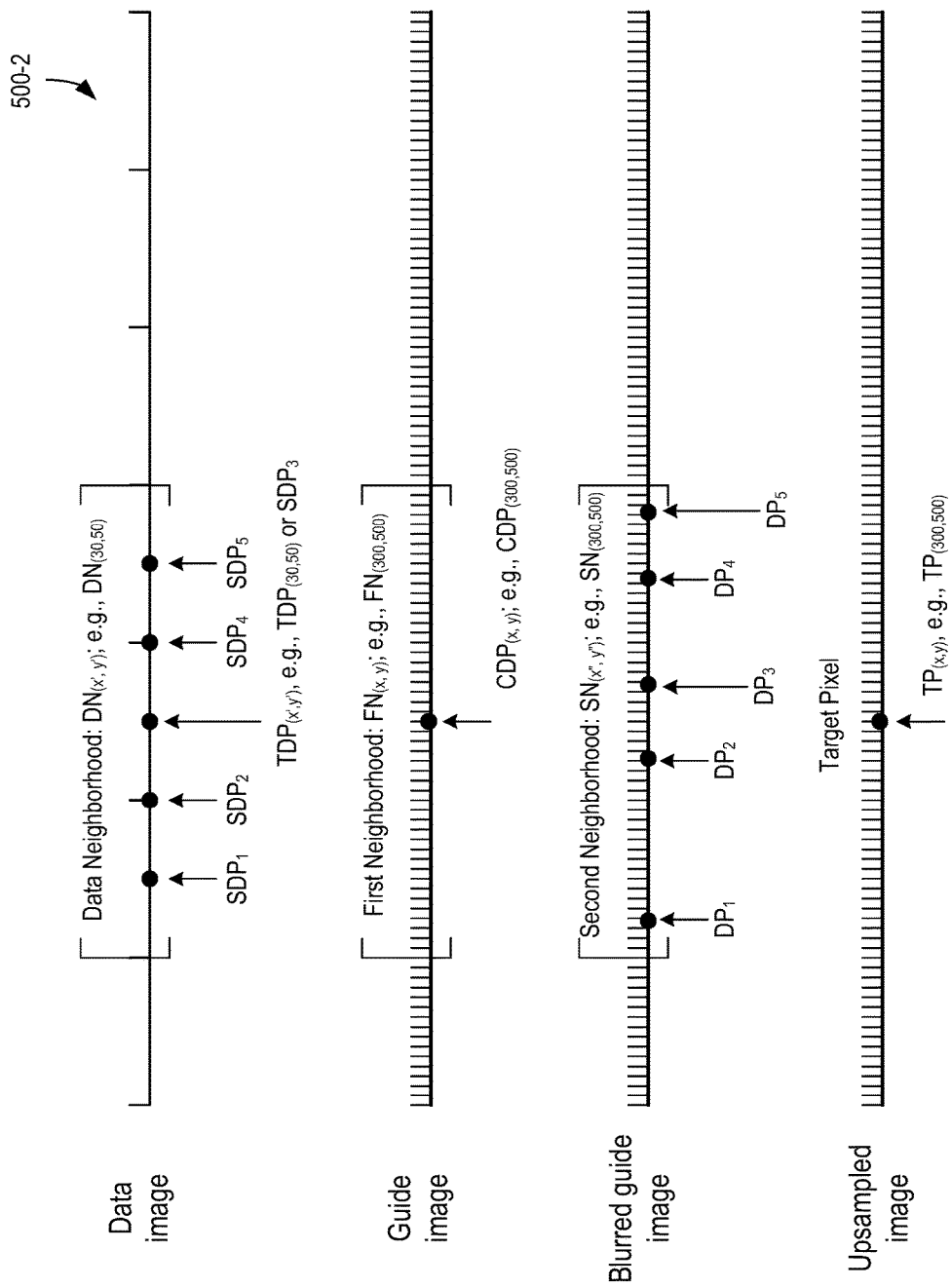
FIG. 5B illustrates an example schematic for data processing according to the fast edge-preserving upsampling methods.

Details on data calculation for upsampled image 250 can be found in description of FIGS. 2-5, in particular in the description of steps 308-314 of FIG. 3 and FIGS. 5A and 5B.

The embodiments disclosed herein are described with reference to separate modules executed by user device 102. However, a greater or smaller number of modules (or no modules at all) can be used to implement the features described herein. For example, the functionality of a single module (e.g., data image module 110) can be broken out into several different modules. The functionality of several modules (e.g., data image module 110, first guide image module 120, second guide image module 130, etc.) can be combined into a single module that includes the functionality of each of the modules described above. Additionally, even though various functionalities of user device 102 are described as separate functional modules, such functionalities can be performed automatically once a user device identifies a data image and one or more guide images.

FIGS. 2A and 2B provides illustrations of example processes 200-1 and 200-2 of the fast edge-preserving upsampling methods. As shown in illustration 200-1 in FIG. 2A, input image (e.g., 210) is converted to first guide image 230 which is in turn converted to second guide image 240. First guide image 230 is then combined with a second guide image 240 to upsample small data image 220 to create upsampled image 250. In some embodiments, input image 210, data image 220, guide images 230 and 240, and upsampled image 250 are stored on a centralized image database 106.

In some embodiments, a fast edge-preserving upsampling method disclosed herein starts with input image 210. As disclosed herein, the terms "input image," "large input image," "initial image" and "original large image" can be used interchangeably unless otherwise specified.

For example, input image 210 is a large image containing edge information that will be applied to data image 220 during the upsampling process. In some embodiments, an edge represents points in an image where brightness changes sharply. In some embodiments, input image 210 is related to data image 220. For example, input image 210 may be a larger version of image 220. In some embodiments, input image 210 is not related to data image 220 and may contain image information that differs completely from that of data image 220.

In some embodiments, data image 220 is an adjusted image, which is obtained after an original image is divided into multiple bins and one or more types of bin-specific adjustments are applied to each bin. Additional details on spatially localized image editing methods can be found in application Ser. No. 15/275,205 filed on Sep. 23, 2016, entitled "METHODS AND SYSTEMS FOR SPATIALLY LOCALIZED IMAGE EDITING", which is hereby incorporated by reference in its entirety.

In some embodiments, data image 220 includes data information that is partially or completely different from that of upsampled image 250 or input image 210. In some embodiments, the data image comprises modification data to be applied to the final upsampled image 250. For example, modification data can be color modification. In some embodiments, data image 220 can be color information that can be upsampled and applied to input image 210 to create upsampled image 250. This is particularly important when visual effects (e.g., color) need to be seamlessly applied to a large image. For example, in order to add additional visual effects to a large image, a user may manually add color information to small data image 220; e.g., adding blue color to a region representing the sky or adding green color to a region representing a field. In some embodiments, data image 220 is a color pixel map, with at least a few of the pixels being in one or more colors. For example, modification information can be an additional image element that can be overlaid on an existing image. In some embodiments, data image 220 comprises information for creating a special effect such as adding ocean to an image. Data image 220 can be upsampled based on edge preserving upsampling techniques, using, for example, a grey version of a large image as a guide image. In some embodiments, a second guide image is needed. After data image 220 is upsampled to the size of the original large image, the modification data (e.g., additional color) can be applied pixel-by-pixel to the original input image to render a final upsampled image.

In some embodiments, upsampling module 140 uses first guide image 230 to provide edge information for upsampling data image 220. As disclosed herein, the terms "first guide image" and "first guide" can be used interchangeably unless otherwise specified.

In some embodiments, first guide image 230 can be a pre-existing image on image database 106. In some embodiments, a user can select second guide image 240 among images saved on image database 106. For example, user device 102 can implement a menu or pull down command list through I/O module 104. In some embodiments, first guide image is created based on an input mage 210. In some embodiments, first guide image 230 is a grey version of input image 210. In some embodiments, first guide image 230 is input image 210 with only one color channel (one of red/green/blue: RGB or one of cyan/magenta/yellow/black: CMYK). In some embodiments, first guide image 230 is input image 210. In some embodiments, first guide image 230 is unrelated to either input image 210 or data image 220.

To generate a large image from a small image, a significant portion of the data information in the large image is created through interpolation of data in the smaller image. Often, the large image loses sharp edges and becomes blurry. Edge information is needed to preserve sharpness in an image after an upsampling operation. In accordance with the methods and systems disclosed herein, first guide image 230 provides the edge information for the edge preserving upsampling algorithm. In some embodiments, upsampling module 140 applies only partial edge information from first guide image 230 during upsampling at upsampling module 140.

In some embodiments, the fast edge-preserving upsampling method disclosed herein further comprises second guide image 240. As disclosed herein, the terms "second guide image" and "second guide" can be used interchangeably unless otherwise specified.

In some embodiments, second guide image 240 is a pre-existing image on image database 106. In some embodiments, a user can select second guide image 230 among images saved on image database 106. For example, user device 102 can implement a menu or pull down command list via I/O module 104.

In some embodiments, second guide image module 130 creates second guide image 240 based on first guide image 230. In some embodiments, second guide image processing module 130 creates second guide image 240 by blurring first guide image 230. In some embodiments, second guide image processing module 130 creates second guide image 240 by resizing first guide image 230. In some embodiments, second guide image 240 is a smaller version of first guide image 230. In some embodiments, second guide image 240 is of the same size as data image 210.

In some embodiments, upsampling module 140 creates upsampled image 250 by upsampling data image 220 based on first guide image 230 and second image 240. As disclosed herein, the terms "upsampled image," "result image," "upsampled result image," "final image," "final result image," or "final upsampled image" can be used interchangeably unless otherwise specified.

In order to generate upsampled image 250, a large of amount of data needs to be created. For example, if the amount of data in data image 220 is x and upsampling factor is 100, the additional amount of data needed for creating upsampled image 250 will be 99x. Here, each dimension of upsampled image 250 is 10 times the sizes of a corresponding dimension of data image 220. In this simple example, one data point from data image 220 needs to be turned into 100 data points in upsampled image 250. In a more realistic example, each dimension of upsampled image 250 can be 100 times the sizes of a corresponding dimension of data image 220. In the latter example, one data point from data image 220 is turned into 10,000 data points in upsampled image 250. To avoid repetition and create smooth transitions, data information from data image 230 will be combined with image data from one or more guide images (e.g., first guide image 230 and/or second guide image 240) to generate data information in upsampled image 250.

Upsampling algorithms with an edge preserving element can be applied when upsampling from data image 220 to upsampled image 250. Sample upsampling algorithms include but are not limited to a joint bilateral upsample filter, a Fourier transform filter, an integer factor, or the Guided Filter, any of which can be implemented with an edge preservation element.

In process 200-2 depicted in FIG. 2B, a data image (e.g., 225) is upsampled to a final upsample image (e.g., 275) in a sequential manner via one or more intermediate upsample images (e.g., 265). For example, data image 225 is first upsampled to an intermediate edge persevered upsampled image 265 before intermediate upsampled image 265 is further upsampled to a final upsample image 275. As disclosed herein, the terms "edge preserved upsampled image" and "upsampled image" are used interchangeably unless otherwise specified.

As disclosed herein, data image 225 can be upsampled based on edge preserving upsampling techniques, based on a series of guide images, including, for example, a grey version of a large image as a first guide image and two or more smaller guide images such as second guide image 245 and third guide image 255. In some embodiments, third guide image 255 is smaller than second guide image 245, which is already smaller than first guide image 235. In some embodiments, data corresponding to the edge information from original large input image 215 is also sequentially reduced in second guide image 245 and third guide image 255. As such, a smaller or more coarse version of final upsampled image 275 in the form of intermediate upsampled image 265 can be quickly presented to the user before it is replaced by the more detailed and refined final upsampled image 275.

In some embodiments, a fast edge-preserving upsampling method disclosed herein starts with input image 215. As disclosed herein, the terms "input image," "large input image," "initial image" and "original large image" can be used interchangeably unless otherwise specified.

In some embodiments, input image 215 is a large image containing the edge information that will be applied to data image 225 during the upsampling process. In some embodiments, an edge represents points in an image where brightness changes, sometimes. In some embodiments, an edge represents points in an image where color or shape changes. In some embodiments, such changes take place sometimes sharply. In some embodiments, input image 215 is related to data image 225. For example, input image 215 may be a larger version of image 225. In some embodiments, input image 215 is not related to data image 225 and may contain image information that differs completely from that of data image 225.

In some embodiments, data image 225 is an adjusted image. For example, an adjusted image can be obtained after an original image is divided into multiple bins and one or more types of bin-specific adjustments are applied to each bin. For example, additional details on spatially localized image editing methods can be found in application Ser. No. 15/275,205 filed on Sep. 23, 2016, entitled "METHODS AND SYSTEMS FOR SPATIALLY LOCALIZED IMAGE EDITING" and filed concurrently herewith, which hereby incorporated by reference in its entirety.

In some embodiments, data image 225 includes data information that is partially or completely different from that of upsampled image 275 or input image 215. In some embodiments, the data image comprises modification data to be applied to the final upsampled image 275. For example, modification data can be color modification. In some embodiments, data image 225 can be color information that can be upsampled and applied to input image 215 to create upsampled image 275. This is particularly important when visual effects (e.g., color) need to be seamlessly applied to a large image. For example, a data image containing color information can be 20 pixel×30 pixel and can be upsampled an image of 200×300. Effectively, color information in one pixel in the data image is applied to 100 pixels in the upsampled image. In some embodiments, in order to add additional visual effects to a large image, a user may manually add color information to only selected pixels in small data image 225; e.g., adding blue color to a region representing the sky or adding green color to a region representing a field. In some embodiments, data image 225 is a random color pixel map, with at least a few of the pixels being in one or more colors. In some embodiments, modification information can be an additional image that can be overlaid on an existing image. In some embodiments, data image 225 comprises information for creating a special effect such as adding ocean to an image.

After data image 225 is upsampled to the size of a larger image (e.g., intermediate upsampled image 265, final upsampled image 275 or an equivalent thereof), the modification data (e.g., additional color) can be applied pixel-by-pixel to the original input image to render the larger upsampled image.

In some embodiments, upsampling module 140 uses first guide image 235 to provide edge information for upsampling data image 225. As disclosed herein, the terms "first guide image" and "first guide" can be used interchangeably unless otherwise specified.

In some embodiments, first guide image 235 is a single channel representation of large input image 215. For example, in some embodiments, first guide image 235 is a grey version of input image 215. In some embodiments, first guide image 235 is input image 215 with only one color channel (one of red/green/blue: RGB or one of cyan/magenta/yellow/black: CMYK). In some embodiments, first guide image 235 is input image 215. In some embodiments, first guide image 235 is unrelated to either input image 215 or data image 225. In some embodiments, large input image 215 can be globally adjusted to highly edge information.

In some embodiments, first guide image 235 can be a pre-existing image on image database 106. For example, user device 102 can implement a menu or pull down command list through I/O module 104 for user selection. In some embodiments, the fast edge-preserving upsampling method disclosed herein further comprises second guide image 245. As disclosed herein, the terms "second guide image," "second guide" and "second image" can be used interchangeably unless otherwise specified.

In some embodiments, second guide image 245 is a pre-existing image on image database 106. In some embodiments, a user can select second guide image 245 among images saved on image database 106. For example, user device 102 can implement a menu or pull down command list via I/O module 104 for user selection.

In some embodiments, additional guide image module 130 creates second guide image 245 based on first guide image 235. For example, additional guide image processing module 130 creates second guide image 245 by blurring first guide image 235. In some embodiments, additional guide image processing module 130 creates second guide image 245 by resizing first guide image 235. In some embodiments, second guide image 245 is a smaller version of first guide image 235. In some embodiments, second guide image 245 is of the same size as data image 215 but contains less edge information.

In some embodiments, the fast edge-preserving upsampling method disclosed herein further comprises third guide image 255. As disclosed herein, the terms "third guide image," "third guide" and "third image" can be used interchangeably unless otherwise specified.

In some embodiments, third guide image 255 is a pre-existing image on image database 106. In some embodiments, a user can select third guide image 255 among images saved on image database 106. For example, user device 102 can implement a menu or pull down command list via I/O module 104 for user selection.

In some embodiments, additional guide image module 130 creates third guide image 255 based on second guide image 245. For example, additional guide image processing module 130 creates third guide image 255 by further blurring second guide image 245. In some embodiments, additional guide image processing module 130 creates third guide image 255 by resizing first guide image 235 or second guide image 245. In some embodiments, additional guide image module 130 creates third guide image 255 based on first guide image 235. For example, edge information from first guide image 235 can be split between second guide image 245 and third guide image 255. For example, edge information in third guide image 255 further supplements or complements edge information in second guide image 245.

In some embodiments, third guide image 255 is a smaller version of first guide image 235 that is smaller than second guide image 245. In some embodiments, third guide image 255 is a smaller version of second guide image 245. In some embodiments, third guide image 255 is of the same size as data image 215 but contains less edge information.

In some embodiments, data image 225 is first upsampled based on third guide image 255 to render intermediate edge preserved upsampled image 265. As disclosed herein, the terms "intermediate edge preserved upsampled image," "intermediate upsampled image" and "intermediate image" can be used interchangeably unless otherwise specified.

In some embodiments, intermediate upsampled image is rendered based on both third guide image 255 and second guide image 245 based on the computation process illustrated in FIG. 5B.

Intermediate upsampled image 265 can be subsequently upsampled to a larger size (e.g., the size of original large input image 215). Because third guide image 255 tends to be much smaller than first guide image 235 or large input image 215, intermediate upsampled image 265 can be quickly generated and presented to the user, while the system is concurrently computing the larger or more detailed final upsampled image 275.

In some embodiments, upsampling module 140 creates final upsampled image 275 by intermediate upsampled image 265 based on second image 245. As disclosed herein, the terms "upsampled image," "result image," "upsampled result image," "final image," "final result image," or "final upsampled image" can be used interchangeably unless otherwise specified.

To generate a large image from a small image, a significant portion of the data information in the large image is created through interpolation of data in the smaller image. Often, the large image loses sharp edges and becomes blurry. Edge information is needed to preserve sharpness in an image after an upsampling operation. In accordance with the methods and systems disclosed herein, first guide image 235, second guide image 245 and/or third guide image 255 provides the edge information necessary for upsampling, independently or collectively. In some embodiments, upsampling module 140 applies only partial edge information from first guide image 235, second guide image 245 and/or third guide image 255 during upsampling.

In order to generate upsampled image 275, a large of amount of data needs to be created. For example, if the amount of data in data image 220 is x and upsampling factor to intermediate upsampled image 265 is 100, the additional data needed to create intermediate upsampled image 265 will be 99x. Here, the amount of data in intermediate upsampled image 265 is y. If intermediate upsampled image 265 will be further upsampled 100 times to final upsampled image 275, the additional amount of data to be created will be 99y.

In this simple example, each dimension of intermediate upsampled image 265 is 10 times the sizes of a corresponding dimension of data image 220. As such, one data point from data image 225 needs to be turned into 100 data points in intermediate upsampled image 265. Each dimension of upsampled image 275 is 10 times the sizes of a corresponding dimension of intermediate upsampled image 265. As such, one data point from upsampled image 265 needs to be turned into 100 data points in upsampled image 275.

Effectively, one data point from data image 225 is turned into 10,000 data points in upsampled image 275. In some embodiments, to avoid repetition and create smooth transitions, data information from data image 225 will be combined with image data from one or more guide images (e.g., first guide image 235, second guide image 245, and/or third image 255) to generate data information in upsampled image 275. In some embodiments, more than three guide images are used to sequentially upsample a data image to a final upsampled image.

Any suitable upsampling algorithms with an edge preserving element can be applied when upsampling from a data image to upsampled image, either directly or via one or more intermediate upsampled images. Sample upsampling algorithms include but are not limited to a joint bilateral upsample filter, a Fourier transform filter, an integer factor, or the Guided Filter, any of which can be implemented with an edge preservation element.

Known edge preserving upsample algorithms can be cumbersome and time-consuming because they require sampling of all data information in a guide image. The methods disclosed herein only selectively sample data information from first guide image 235, second guide image 245, and/or third guide image 255. For example, for an intermediate target pixel in intermediate upsampled image 265, a plurality of pixels are identified in data image 225. For a target pixel in upsampled image 275, a plurality of pixels are identified in intermediate upsampled image 265. In some embodiments, five pixels are identified, as illustrated in FIGS. 5A and 5B. Image data for the plurality of pixels are used to compute weighted averages of these data, which are then assigned as the image data for target pixel. Weights for the image data for the plurality of pixels are calculated based on selected data information from first guide image 235, second guide image 245, and third guide image 255. Detailed examples of such calculations can be found in the description of steps 308-310 in FIG. 3 and the description of FIGS. 5A and 5B.

Example Processes

FIG. 3 is flow diagram of an example process 300 of the fast edge-preserving upsampling methods. For example, process 300 can be performed by user device 102 to selectively upsample a data image. The flow diagram illustrates how a data image 220 is combined with first guide image 230 and second guide image 240 before being upsampled to edge preserved upsampled image 250.

At step 302, user device 102 can obtain data image 220. For example, data image module 110 of user device 102 can obtain data image 220. For example, data image 220 can be much smaller than the final upsampled image. In some embodiments, data image 220 is a smaller version of the final upsampled image 250. In some embodiments, data image module 110 or a separate image editing module can create data image 220 by editing and downsampling an input image. For example, data image module 110 or a separate image editing module can divide an input image into multiple bins (e.g., m×n bins each comprising multiple pixels) and perform localized image adjustment/editing in each bin to render a data image with m×n pixels corresponding to the number of bins. Additional details on spatially localized image editing methods can be found in application Ser. No. 15/275,205 filed on Sep. 23, 2016, entitled "METHODS AND SYSTEMS FOR SPATIALLY LOCALIZED IMAGE EDITING" and filed concurrently herewith, which hereby incorporated by reference in its entirety.

In some embodiments, data image 220 is unrelated to the input image or any guide image. For example, data image 220 can include only color information that can be upsampled and applied to a larger and unrelated image.

At step 304, first guide image module 120 can obtain first guide image 230. In some embodiments, first guide image 230 is a grey image converted from an original input image 210. In some embodiments, first guide image 230 is unrelated to either input image 210 or final upsampled image 250.

At step 306, second guide image module 130 obtains second guide image 240 based on first guide image 230. In some embodiments, second guide image 240 is a blurred version of first guide image 230. In some embodiments, second guide image 240 is a downsampled version of first guide image 230. In some embodiments, second guide image 240 is of the same size as data image 220. In some embodiments, the second guide image can also be a conventionally upsampled version of the data image.

At steps 308-314, upsampling module 140 creates a large amount of previously unknown data based on data information from the data image and one or more guide images (e.g., first guide image 230 and second guide image 240). Prior to upsampling, image values of upsampled image 250 are unknown except, for example, the size of upsampled image 250, which can be determined based on the size of data image 220 and upsampling factor uF. As noted above, due to the size difference between the smaller data image 220 and larger upsampled image 250, a large amount of previously non-existing data needs to be generated. The larger the upsampling factor uF is, the larger the amount of previously non-existing data are required.

Many known algorithms for resizing an image (e.g., downsamping and/or upsampling) can be used in second guide image module 130 and upsampling module 140. Example algorithms include but are not limited to nearest-neighbor interpolation, bilinear interpolation, bicubic interpolation, Lanczos resampling, Fourier-based interpolation, edge-directed interpolation algorithms, and etc. Preferably, upsampling module 140 applies edge-directed interpolation algorithms when upsampling data image 220 to upsampled image 250 because these algorithms aim to preserve edges in the image after scaling, unlike other algorithms which can produce staircase artifacts around diagonal lines or curves. Example edge preserving algorithms include but are not limited to New Edge-Directed Interpolation (NEDI), Edge- Guided Image Interpolation (EGGI), Iterative Curvature-Based Interpolation (ICBI), and Directional Cubic Convolution Interpolation (DCCI).

In some embodiments, the previously unknown or non-existing data are generated via a pixel-by-pixel upsampling algorithm. The process is illustrated as follows. The goal of the upsampling process is to compute data information for upsampled image 240. For example, upsampling module 140 specifies at step 308 a target pixel in the yet unknown final upsampled image 250 as $TP_{(x,y)}$. In steps 310-314, a sample process is illustrated to show how data information for $TP_{(x,y)}$ is calculated.

At step 308, only the size of upsampled image 250 is known. For example, user device 102 allows a user to define an upsampling factor (uF). Upsampling module 140 then identities a target pixel in the yet unknown final upsampled image 250 as $TP_{(x,y)}$, where x and y represents the location of the target pixel within upsampled image 250.

At step 310, for each $TP_{(x,y)}$, upsampling module 140 identifies a data neighborhood (e.g., a data neighborhood $DN_{(x,y)}$ as illustrated in FIGS. 5A and 5B) in data image 220. The target data neighborhood can be determined in multiple ways. For example, upsampling module 140 identifies a first target data pixel $TDP_{(x',y')}$ based on the location of target pixel $TP_{(x,y)}$ in the final upsampled image. In some embodiments, x' is x divided by upsampling factor (uF) and y' is y divided by uF. Once the location of target data pixel $TDP_{(x',y')}$ in data image 220 is determined. In some embodiments, the size of data neighborhood $DN_{(x,y)}$ is defined based on a predetermined size value and the location of target data pixel $TDP_{(x',y')}$.

In some embodiments, data neighborhood $DN_{(x,y)}$ is a circular region centered around target data pixel $TDP_{(x',y')}$. In some embodiments, the circular region has a radius of 3 or more pixels, 50 or more pixels, or 500 or more pixels. In some embodiments, the circular region has a radius of 100 pixels or larger.

In some embodiments, data neighborhood $DN_{(x,y)}$ is a rectangular or square region centered around the target data pixel $TDP_{(x',y')}$. In some embodiments, the rectangular or square region comprises a total of 10 or fewer pixels, 50 or fewer pixels, or 500 or more pixels. In some embodiments, the rectangular or square region includes 100 or more pixels. In some embodiments, data neighborhood $DN_{(x,y)}$ includes a predetermined number of pixels surrounding target data pixel $TDP_{(x',y')}$. The predetermined number of pixels includes a total of 10 or fewer pixels, 15 or fewer pixels, 20 or fewer pixels, 50 or fewer pixels, or 100 or fewer pixels. In some embodiments, predetermined number of pixels includes 100 or more pixels.

In some embodiments, a plurality of selected data pixels will be identified within data neighborhood $DN_{(x,y)}$. In some embodiments, the plurality of selected data pixels includes 3 or more pixels, 50 or more pixels, or 500 or more pixels. In some embodiments, the plurality of selected data pixels may be evenly distributed within data neighborhood $DN_{(x,y)}$, near or surrounding target data pixel $TDP_{(x',y')}$.

In some embodiments, the plurality of selected data pixels may be randomly selected within data neighborhood $DN_{(x,y)}$, near or surrounding target data pixel $TDP_{(x',y')}$. In some embodiments, the plurality of selected data pixels may include pixel $TDP_{(x',y')}$. In some embodiments, the plurality of selected data pixels may be randomly selected within data neighborhood $DN_{(x,y)}$, regardless of their relative positions to target data pixel $TDP_{(x',y')}$.

At step 312, upsampling module 140 determines one or more weights for each pixel in the plurality of selected data pixels in data image 220. For example, upsampling module 140 identifies a center data point in first neighborhood $FN_{(x',y')}$ within first guide image 230. In some embodiments, upsampling module 140 also identifies a plurality of data points in second neighborhood $SN_{(x',y')}$ within second guide image 230, each data point corresponding to a pixel in the plurality of selected data pixels. Next, upsampling module 140 determines one or more weights for each of the pixels in the plurality of selected data pixels based on the values of the plurality of data points in relations to the center data point. Example weights include but are not limited to geometric distance weight, image value weight and etc.

At step 314, upsampling module 140 calculates weighted averages of image data for the plurality of selected data pixels. The weighted averages of image data are then used as the image data for target pixel $TP_{(x,y)}$ in final upsampled image 250.

FIG. 4 is flow diagram of an example process 400 of the fast edge-preserving upsampling methods. For example, process 400 can be performed by user device 102 to expand selectively upsampling method illustrated in FIG. 3 for all pixels in upsampled image 250. The flow diagram illustrates how a data image 220 is combined with first guide image 230 and second guide image 240 before being upsampled to edge preserved upsampled image 250.

At step 410, user device 102 can specify a target pixel in final image 250. For example, upsampling module 140 can specify a target pixel in final image 250; e.g., by its location in final image 250. For example, a target pixel in the yet unknown final upsampled image 250 is specified as $TP_{(x,y)}$, where x and y specify the physical location of the target pixel in final image 250. Additional details concerning target pixel selection can be found, for example, in the description of step 308 in FIG. 3 and description of FIGS. 5A and 5B.

At step 420, upsampling module 140 further identifies a plurality of selected data pixels corresponding to target pixel $TP_{(x,y)}$ within a neighborhood of data image 220. In some embodiments, the plurality of selected data pixels includes a target data pixel $TDP_{(x',y')}$. First, upsampling module 140 identifies a data neighborhood (e.g., data neighborhood $DN_{(x,y)}$ as illustrated in FIGS. 5A and 5B) in data image 220. Subsequently, upsampling module 140 identifies a plurality of selected data pixels within data neighborhood $DN_{(x,y)}$. Details of data neighborhood $DN_{(x,y)}$ and selections of data pixels can be found, for example, in the description of step 310 in FIG. 3 and description of FIG. 5.

At step 430, upsampling module 140 calculates weighted averages of image characteristics of each data pixel of the plurality of selected data pixels. Image characteristics include but are not limited to, for example, color value, intensity, exposure, contrast and etc. Details on calculations of weights and weighted averages can be found, for example, in the description of steps 312 and 314 in FIG. 3 and description of FIG. 5.

At step 440, upsampling module 140 determines if there are additional target pixels in upsampled image 250 whose image values remain undetermined. If there are still undetermined target pixels, the method continues to step 450.

At step 450, upsampling module 140 identifies and specifies a new target pixel in upsampled image 250 whose image values are undetermined. Upsampling module 140 goes through an iterative loop algorithm. For example, upsampling module 140 follows the methods at steps 410-430 to determine the image values for the new target pixel.

At step 460, upsampling module 140 repeats process 400 until image values for each pixel in upsampled image 250 are determined. Upsampled module 140 then generates upsampled image 250. Here, upsample image 250 is the result image from step 410.

In some embodiments, iterative upsampling can be adopted. For example, an iterative upsampling process can be used to create a panorama image. A second iterative loop algorithm can be implemented; for example, via steps 470 and 480.

At step 470, upsampling module 140 determines if further upsampling is needed. If further upsampling is needed, the method continues to step 480.

At step 480, the upsampled image from the previous cycle (e.g., the image from step 460) is used as a new data image. At this step, upsampling module 140 also defines the size of a new result image. For example, upsampling module 140 can specify a new upsampling factor. This new data image will be upsampled in a new iterative loop cycle by repeating steps 410 through 470 until no further upsampling is needed. Such a iterative upsampling process can be used to generate more complexed image such as a panorama image.

When upsampling module 140 determines that no further upsampling is needed, the upsampling process terminates at step 490.

Edge Preserving Upsampling

FIGS. 5A and 5B illustrate example schematics 500 for image data processing according to the fast edge-preserving upsampling methods disclosed herein. For example, schematic 500 illustrates how user device 102 specifies a target pixel $TP_{(x,y)}$ in upsampled image 250, identifies multiple data pixels within predetermined data neighborhood $DN_{(x,y)}$ in data image 220, computes weights for the data pixels based on one or more guide images (e.g., first guide image 230 and/or second guide image 240), and then calculates weighted averages for image values of the data pixels.

FIGS. 5A and 5B present an illustration of pixel and/or data point selection in a one dimensional setting. It will be understood that similar principals and methods can be applied in a two dimensional setting. For example, in a two dimensional setting, predetermined data neighborhood will be determined as a circle, a rectangle, a square or any applicable shape, as described in connection with step 312 of FIG. 3. In some embodiments, predetermined data neighborhoods $NP_{(30,50)}$ includes around target data pixel $TDP_{(30,50)}$. In some embodiments, predetermined data neighborhood $NP_{(30,50)}$ centers around target data pixel $TDP_{(30,50)}$.

Upsampling module 140 initiates an upsampling process by specifying a target pixel $TP_{(x,y)}$ in upsampled image 250. Image values (e.g., intensities, color value, contrast and etc.) of target pixel $TP_{(x,y)}$ will be determined during the upsampling process. For example, upsampling module 140 calculates the color value of target pixel $TP_{(x,y)}$ as a weighted average of color values of selected pixels from data image 220. Weights of the selected pixels can be determined using one or more guide images as illustrated below.

Upsampling module 140 then determines a target data pixel $TDP_{(x',y')}$ based on $TP_{(x,y)}$. For example, in an upsampled image that is 1,000 pixel by 1,000 pixel in size, a target pixel located at (300,500) is specified as: $TP_{(300,500)}$. If upsampling factor is 100, data image will be 100 pixel by 100 pixel in size. A target data pixel corresponding to target pixel $TP_{(300,500)}$ will be $TDP_{(30,50)}$.

Upsampling module 140 subsequently selects multiple data pixels within the predetermined data neighborhood in data image 220 for further processing. To enhance efficiency, upsampling module 140 selects only a small portion of the data information from the predetermined data neighborhood in data image 220. For example, upsampling module 140 can select a plurality of selected data pixels: $\{SDP_1, SDP_2, SDP_2, SDP_4,$ and $SDP_5\}$. In some embodiments, $SDP_3$ is $TDP_{(30,50)}$. For example, 4 additional data pixels are selected within predetermined data neighborhood $NP_{(30,50)}$ for a total of 5 data pixels, including $TDP_{(30,50)}$. In some embodiments, the plurality of selected data pixels does not include $TDP_{(30,50)}$. In some embodiments, the selected data pixels are evenly distributed across predetermined data neighborhood $DN_{(30,50)}$. In some embodiments, the selected data pixels are randomly selected across predetermined data neighborhood $DN_{(30,50)}$.

Next, upsampling module 140 determines first neighborhood $FN_{(x,y)}$ such as $FN_{(300,500)}$ in first guide image 230 and identifies a center data point $CDP_{(300,500)}$ in first neighborhood $FN_{(300,500)}$. In some embodiments, center data point $CDP_{(300,500)}$ is located at the physical center of first neighborhood $FN_{(300,500)}$. In FIG. 5A, only first guide image 230 is needed for calculating weights. In some embodiments, 5 additional data points will be selected in first neighborhood $FN_{(300,500)}$, each corresponding to one of the selected data pixels from data image 220: $\{ADP_1, ADP_2, ADP_3, ADP_4,$ and $ADP_5\}$. Image values of center data point $CDP_{(300,500)}$ and 5 additional data points will be used to calculate one or more weights for each of the selected data pixels from data image 220. For example, a geometric distance weight ($w_g$) can be calculated based on the locations of an additional data point (e.g., $ADP_1$) and of center data point $CDP_{(300,500)}$: a higher weight is assigned when additional data point $ADP_1$ is close to center data point $CDP_{(300,500)}$ and a lower weight is assigned when additional data point $ADP_1$ is far away from center data point $CDP_{(300,500)}$. The weighted average of the selected data pixels from data image 220 can be calculated as:

$$\text{weighted average} = \frac{\sum (\text{data image value} * \text{weight})}{\sum \text{weights}} \quad (1)$$

$$\text{weighted average} = \frac{\begin{pmatrix} SDP_1 * w_{1g} + SDP_2 * w_{2g} + SDP_3 * w_{3g} + \\ SDP_4 * w_{4g} + SDP_5 * w_{5g} \end{pmatrix}}{(w_{1g} + w_{2g} + w_{3g} + w_{4g} + w_{5g})} \quad (2)$$

In some embodiments, a value distance weight ($w_v$) can be calculated based on the image values of an additional data point (e.g., $ADP_1$) and of center data point $CDP_{(300,500)}$: a higher weight is assigned when additional data point $ADP_1$ is close in value to center data point $CDP_{(300,500)}$ and a lower weight is assigned when the image value of additional data point $ADP_1$ is far away from center data point $CDP_{(300,500)}$. Example image values include but are not limited to color intensity, brightness, contrast, exposure and etc. Weighted average can also be calculated based on equations (1) and (2) or a similar equation using value distance weights ($w_v$). In some embodiments, a compound weight is computed for each selected data point:

$$\text{compound weight} = w_g * w_v \quad (3)$$

In some embodiments, upsampling module 140 upsamples data image 220 based on two guide images: first guide image 230 and second guide image 240, as illustrated in FIG. 5B. In some embodiments, more than two guide images may be used.

For example, methods described in connection with FIG. 5A are also applicable. In particular, upsampling module 140 initiates an upsampling process by specifying a target pixel $TP_{(x,y)}$ in upsampled image 250. Based on $TP_{(x,y)}$, upsampling module 140 then determines a target data pixel $TDP_{(x',y')}$. For example, in an upsampled image that is 1,000 pixel by 1,000 pixel in size, a target pixel located at (300,500) is specified as: $TP_{(300,500)}$. If upsampling factor is 100, data image will be 100 pixel by 100 pixel in size. A target data pixel corresponding to target pixel $TP_{(300,500)}$ will be $TDP_{(30,50)}$.

Upsampling module 140 subsequently selects multiple data pixels within the predetermined data neighborhood in data image 220 for further processing. To enhance efficiency, upsampling module 140 selects only a small portion of the data information from the predetermined data neighborhood in data image 220. For example, upsampling module 140 can select a plurality of selected data pixels: {$SDP_1$, $SDP_2$, $SDP_2$, $SDP_4$, and $SDP_5$}. In some embodiments, $SDP_3$ is $TDP_{(30,50)}$.

Next, upsampling module 140 determines first neighborhood $FN_{(x,y)}$ such as $FN_{(300,500)}$ in first guide image 230 and identifies a center data point $CDP_{(300,500)}$ in first neighborhood $FN_{(300,500)}$. In some embodiments, center data point $CDP_{(300,500)}$ is located at the physical center of first neighborhood $FN_{(300,500)}$.

Next, upsampling module 140 determines second neighborhood $SN_{(x'',y'')}$ such as $SN_{(300,500)}$ in second guide image 240 before it identifies a plurality of data points in second neighborhood $SN_{(300,500)}$, which can be designated as the following: {$DP_1$, $DP_2$, $DP_3$, $DP_4$, and $DP_5$}. As disclosed herein above, second guide image 240 can be created based on first guide image 230. For example, second guide image 240 can be a blurred or reduced version of first guide image 230. In some embodiments, second guide image 240 is of the same size as data image 220. In some embodiments, second guide image 240 is optional and weighted average of selected data points from data image 220 can be calculated solely based on information from first guide image 230.

In some embodiments, weights, for example, geometric distance weights or value distance weights, of the selected data pixels will be calculated based on center data point $CDP_{(300,500)}$ from first guide image 230 and data points: $DP_1$, $DP_2$, $DP_3$, $DP_4$ and $DP_5$ from second guide image. Weighted averages can be calculated similarly based on equations (1) and (2).

The weighted average of the selected data pixels from data image 220 can be calculated as:

$$\text{weighted average} = \frac{\sum (\text{data image value} * \text{weight})}{\sum \text{weights}}$$

$$\text{weighted average} = \frac{\left(\begin{array}{c} SDP_1 * w_{1g} + SDP_2 * w_{2g} + SDP_3 * w_{3g} + \\ SDP_4 * w_{4g} + SDP_5 * w_{5g} \end{array}\right)}{(w_{1g} + w_{2g} + w_{3g} + w_{4g} + w_{5g})}$$

In some embodiments, a value distance weight ($w_v$) can be calculated based on the image values of an additional data point (e.g., $ADP_1$) and of center data point $CDP_{(300,500)}$: a higher weight is assigned when additional data point $ADP_1$ is close in value to center data point $CDP_{(300,500)}$ and a lower weight is assigned when the image value of additional data point $ADP_1$ is far away from center data point $CDP_{(300,500)}$. Example image values include but are not limited to color intensity, brightness, contrast, exposure and etc. Weighted average can also be calculated based on equations (1) and (2) or a similar equation using value distance weights ($w_v$). In some embodiments, a compound weight is computed for each selected data point:

$$\text{compound weight} = w_g * w_v$$

Once a weighted average of selected data points from data image 220 (e.g., $SDP_1$, $SDP_2$, $SDP_3$, $SDP_4$, and $SDP_5$) is determined, the weight average value can be assigned to target pixel $TP_{(x,y)}$ in upsampled image 250.

As disclosed in FIG. 4, the process can be repeated until values for each target pixel in upsampled image 250 are determined, thereby rendering a complete upsampled image 250.

A number of algorithms known for resizing an image (e.g., including downsizing and upsizing) can be used. Example algorithms include but are not limited to nearest-neighbor interpolation, bilinear interpolation, bicubic interpolation, Lanczos resampling, Fourier-based interpolation, edge-directed interpolation algorithms, and etc. Preferably, edge-directed interpolation algorithms are used because these algorithms aim to preserve edges in the image after scaling, unlike other algorithms which can produce staircase artifacts around diagonal lines or curves. Example edge preserving upsampling algorithms include but are not limited to New Edge-Directed Interpolation (NEDI), Edge-Guided Image Interpolation (EGGI), Iterative Curvature-Based Interpolation (ICBI), and Directional Cubic Convolution Interpolation (DCCI). As disclosed herein, existing edge preserving algorithms will be modified to implement selective sampling.

One of skill in the art would understand that upsampling module 140 can apply any upsampling algorithm with edge preservation in the current method. Additionally, upsampling module 140 can also adopt any applicable methods for computing weights and weighted averages.

Graphical User Interfaces and Image Editing Control

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

In some embodiments, the GUIs include multiple image editing controls. For example, each image editing control can be used to adjust the values for one or more of image parameters. In some embodiments, a parameter as disclosed herein includes image characteristics such as exposure, brightness, shadows, highlights, contrast, blackpoint and combinations thereof. In some embodiments, a parameter as disclosed herein includes constants or variables in an adjustment curve that helps to define the relationships between image characteristics such as exposure, brightness, shadows, highlights, contrast, and blackpoint.

In some embodiments, one of more slider designs can be employed as part of I/O module 104. For example, a user can change the position of a slider bar to define a desirable value for one or more parameters in an adjustment curve. In some embodiments, an image editing control adjust the values of two different parameters, three parameters, four parameters, five parameters, or six or more parameters. For example, setting the median exposure level may also change the values for brightness level, contrast level, shadow level and etc.

Example System Architecture

Figure 6:
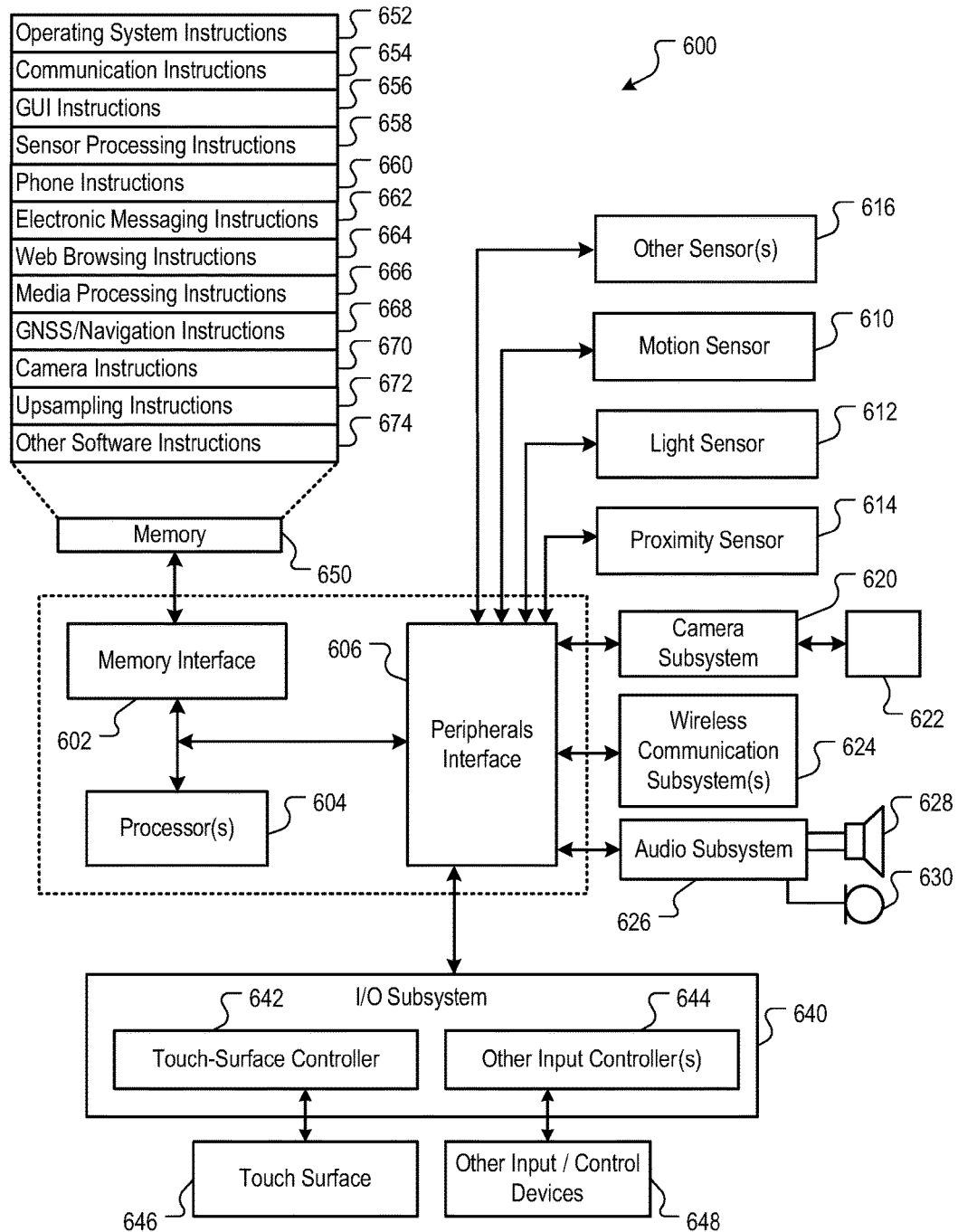
FIG. 6 is a block diagram of an example system architecture implementing the features and processes of FIGS. 1-5.

FIG. 6 is a block diagram of an example computing device 600 that can implement the features and processes of FIGS. 1-5. The computing device 500 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 512, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 524 designed to operate over a GSM network, a GPRS network, an EDGE network, a Wi-Fi or WiMax network, and a Bluetooth™ network. In particular, the wireless communication subsystems 624 can include hosting protocols such that the device 100 can be configured as a base station for other wireless devices.

An audio subsystem 626 can be coupled to a speaker 528 and a microphone 630 to facilitate voice-enabled functions, such as speaker recognition, voice replication, digital recording, and telephony functions. The audio subsystem 526 can be configured to facilitate processing voice commands, voiceprinting and voice authentication, for example.

The I/O subsystem 640 can include a touch-surface controller 642 and/or other input controller(s) 644. The touch-surface controller 642 can be coupled to a touch surface 646. The touch surface 546 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™. The computing device 600 can, therefore, include a 36-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement the image processing features as described with reference to FIGS. 1-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 558 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store image processing software instructions such as image upsampling software instructions 672 to facilitate other processes and functions, such as the image processing processes and functions as described with reference to FIGS. 1-5.

The memory 650 can also store other software instructions 674, such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

We claim:

1. An edge preserving image upsampling method, wherein a data image is used to create a result image based on pixel by pixel upsampling using a first guide image and a second guide image, comprising:

identifying, for a target pixel in the result image based on a location of the target pixel, a plurality of pixels in the data image, wherein the plurality of pixels is within a predetermined neighborhood within the data image; and determining a value of the target pixel in the result image based on a weighted average of the plurality of pixels from the data image based on a plurality of data points from the first and second guide images, wherein the data points are collectively selected from within a first neighborhood in the first guide image and a second neighborhood in the second guide image, both neighborhoods being identified based on the predetermined neighborhood in the data image, and wherein the plurality of data points forms a small subset of the first and second guide images.

2. The edge preserving image upsampling method of claim 1, further comprising:

providing the second guide image based on the first guide image, wherein the first guide image comprises edge information that is preserved in the result image.

3. The edge preserving image upsampling method of claim 1, further comprising:

selecting, for each pixel in the plurality of pixels in the data image, a center data point located at a center of the first neighborhood of the first guide image.

4. The edge preserving image upsampling method of claim 3, further comprising:

selecting, for each pixel in the plurality of pixels in the data image, a plurality of sparse data points within the second neighborhood of the second guide image.

5. The edge preserving image upsampling method of claim 4, wherein each pixel in the plurality of pixels from the data image has a weight that is determined based on the corresponding center data point and sparse data points from the first guide and second guide images.

6. The edge preserving image upsampling method of claim 1, wherein the predetermined neighborhood of m pixels by n pixels, wherein m and n are both integers having maximum values limited by a size of the data image, with m≥3 and n≥3.

7. The edge preserving image upsampling method of claim 1, wherein the first guide image is a grey image that is the same size as the result image.

8. The edge preserving image upsampling method of claim 1, wherein the second guide image is a blurred image of the first guide image.

9. The edge preserving image upsampling method of claim 1, wherein the second guide image is the same size as the data image.

10. The edge preserving image upsampling method of claim 1, wherein the predetermined neighborhood surrounds a data pixel in the data image, and wherein a location of the data pixel in the data image is proportionally determined based on the location of the target pixel in the result image.

11. The edge preserving image upsampling method of claim 1, wherein a size and a location of the first neighborhood are identified proportionally corresponding to the predetermined neighborhood of the data image.

12. The edge preserving image upsampling method of claim 1, wherein a size and a location of the second neighborhood are identified proportionally corresponding to the predetermined neighborhood of the data image.

13. The edge preserving image upsampling method of claim 1, wherein a weight of each pixel in the plurality of pixels from the data image comprises a spatial distance weight component or a value distance weight component.

14. The edge preserving image upsampling method of claim 13, wherein the weight of each pixel in the plurality of pixels from the data image comprises a spatial distance weight component and a value distance weight component.

15. The edge preserving image upsampling method of claim 1, wherein the plurality of pixels comprises 5 pixels.

16. The edge preserving image upsampling method of claim 1, wherein the plurality of pixels comprises 10 pixels.

17. The edge preserving image upsampling method of claim 1, wherein the second guide image is the same size as the first guide image.

18. The edge preserving image upsampling method of claim 1, wherein the second guide image is the same size as the data image.

19. The edge preserving image upsampling method of claim 1, further comprising:

providing the data image that is to be upsampled to the result image, wherein the upsampling factor s (result image/data image) is at least 10 or larger.

20. The edge preserving image upsampling method of claim 1, further comprising:

generating the first guide image based on an original image, wherein the first guide image is a grey version of the original image, and wherein the first guide image is closer in size to the result image than the data image is.

21. The edge preserving image upsampling method of claim 1, further comprising:

converting the first guide image to a second guide image by applying one selected from the group consisting of a blurring function, a downsampling function, and a combination thereof.

22. The edge preserving image upsampling method of claim 1, further comprising:
identifying a new target pixel within the result image.

23. The edge preserving image upsampling method of claim 22, further comprising:
repeating the identifying and determining steps for the new target pixel.

24. The edge preserving image upsampling method of claim 23, further comprising:
repeating the identifying and determining steps for each remaining target pixel in the result image.

25. The edge preserving image upsampling method of claim 24, further comprising:
rendering the result image.

26. A computer system comprising:
one or more processors; and
a memory accessible to the one or more processors, the memory storing instructions executable by the one or more processors for:
identifying, for a target pixel in a result image based on a location of the target pixel, a plurality of pixels in a data image, wherein the data image is upsampled pixel-by-pixel to generate the result image based on a first guide image and a second guide image, and wherein the plurality of pixels is within a predetermined neighborhood within the data image; and
determining a value of the target pixel in the result image based on a weighted average of the plurality of pixels from the data image based on a plurality of data points from the first and second guide images, wherein the data points are collectively selected from within a first neighborhood in the first guide image and a second neighborhood in the second guide image, both neighborhoods being identified based on the predetermined neighborhood in the data image, and
wherein the plurality of data points forms a small subset of the first and second guide images.

27. The computer system of claim 26, wherein the instructions, when executed by the computer processor, further cause the computer processor to:
provide the second guide image based on the first guide image, wherein the first guide image comprises edge information that is preserved in the result image.

28. The computer system of claim 26, wherein the instructions, when executed by the computer processor, further cause the computer processor to:
select, for each pixel in the plurality of pixels in the data image, a center data point located at a center of the first neighborhood of the first guide image; and
select, for each pixel in the plurality of pixels in the data image, a plurality of sparse data points within the second neighborhood of the second guide image.

29. The computer system of claim 26, wherein a size and a location of the first neighborhood are identified proportionally corresponding to the predetermined neighborhood of the data image, and wherein a size and a location of the second neighborhood are identified proportionally corresponding to the predetermined neighborhood of the data image.

30. A non-transitory computer-readable medium containing instructions that, when executed by a computer processor, cause the computer processor to:
identify, for a target pixel in a result image based on a location of the target pixel, a plurality of pixels in a data image, wherein the data image is upsampled pixel-by-pixel to generate the result image based on a first guide image and a second guide image, and wherein the plurality of pixels is within a predetermined neighborhood within the data image; and
determine a value of the target pixel in the result image based on a weighted average of the plurality of pixels from the data image based on a plurality of data points from the first and second guide images, wherein the data points are collectively selected from within a first neighborhood in the first guide image and a second neighborhood in the second guide image, both neighborhoods being identified based on the predetermined neighborhood in the data image, and
wherein the plurality of data points forms a small subset of the first and second guide images.

31. The non-transitory computer-readable medium of claim 30, wherein the instructions, when executed by the computer processor, further cause the computer processor to:
provide the second guide image based on the first guide image, wherein the first guide image comprises edge information that is preserved in the result image.

32. The non-transitory computer-readable medium of claim 30, wherein the instructions, when executed by the computer processor, further cause the computer processor to:
select, for each pixel in the plurality of pixels in the data image, a center data point located at a center of the first neighborhood of the first guide image; and
select, for each pixel in the plurality of pixels in the data image, a plurality of sparse data points within the second neighborhood of the second guide image.

33. The non-transitory computer-readable medium of claim 30, wherein a size and a location of the first neighborhood are identified proportionally corresponding to the predetermined neighborhood of the data image, and wherein a size and a location of the second neighborhood are identified proportionally corresponding to the predetermined neighborhood of the data image.

* * * * *